PROCESS FOR THE PREPARATION OF CRYSTALLINE POLYPROPYLENES

Albert Verheyden, St. Denis Westrem, Belgium, and Paul Ochsner, Geneva, Switzerland, assignors to Union Chimique Belge, S.A., Brussels, Belgium, a corporation of Belgium No Drawing. Filed Jan. 24, 1958, Ser. No. 710,864

Claims priority, application Belgium Feb. 2, 1957

7 Claims. (Cl. 260—93.7)

This invention relates to a process for the preparation of crystalline polypropylenes.

It is known that gaseous or liquid propylene can be polymerized so as to obtain a solid polymer if a catalyst is used which is formed by the reaction of an organometallic derivate of an alkali metal with a metallic compound of a transition metal of groups 4 to 8 inclusive of the periodic system.

Thus, the product of the reaction between titanium tetrachloride and amyl sodium constitutes a particularly effective catalyst for the polymerization of propylene at a temperature of 20° C. and under a pressure of 10 atmospheres, there is formed from propylene dissolved in pentane relatively large quantities of a solid polymer having a consistency similar to that of rubber. This polymer contains substantially equal quantities of amorphous product and crystalline product, called isotaxic. By modifying the proportions of the constituents of this catalyst a propylene containing a higher proportion of the crystalline product is obtained, under the same conditions of polymerization but there is only a very small amount. Increase in crystallinity is obtained at the expense of the quantity of polymer produced.

Small quantities of very crystalline polypropylenes are likewise formed when the catalyst used is the reaction product of titanium tetrachloride and an organometallic compound of zinc, or of an alkaline-earth metal such as magnesium or of an earth metal such as aluminum.

It has now been found that, starting from propylene, large quantities of very crystalline polymers are obtained if the catalyst used is the product obtained from the reaction of titanium with an organometallic compound of sodium and an organometallic compound of cadmium. This new catalyst can be prepared, either by first causing the titanium tetrachloride to react with the organometallic compound of sodium, subsequently adding the organometallic compound of cadmium or by first causing the titanium tetrachloride to react with the organometallic compound of cadmium and subsequently adding the organometallic compound of sodium. It is also possible, as will be seen from the examples hereinafter given, to cause the titanium tetrachloride to react with the mixture of the organometallic compound of sodium and the organometallic compound of cadmium.

The advantage of this new catalyst is that it supplies a polymer of such crystallinity that the elimination by extraction of any amorphous portions which may be present becomes superfluous.

As stated above, the catalyst employed contains an organometallic compound of sodium and also an organometallic compound of cadmium. These organometallic compounds conform to the formula $R_nMe$ where R indicates a hydrocarbon radical containing 2 to 5 atoms of carbon, Me indicates the metal and $n$ the number 1 or 2 according to the valency of the metal.

These organometallic compounds can be prepared by conventional methods.

The crystallinity and the quantity of the polymer produced vary considerably with the composition of the catalyst i.e. with the choice of the proportions of the three constituents. For 1 mol of titanium tetrachloride, 1 to 4 mols of the organometallic compound of sodium are used, and from 0.05 to 3 mols of the organometallic compound of cadmium. It is preferable to use the ratio: 1 mol of titanium tetrachloride, 2.5 mols of organometallic compound of sodium and 0.1 mol of organometallic compound of cadmium. A quantity of this catalyst corresponding to 1 mol of titanium tetrachloride permits the polymerization of 15 to 75 mols of propylene under the conditions described below. By extending the duration of the reaction and the concentration of the propylene, the yield is improved still further.

A particularly crystalline polymer is formed when the catalyst is prepared in an insert solvent such as pentane, in which it remains in suspension. The latter is subsequently saturated with propylene at a temperature lying between 0° C. and 40° C., but preferably at a temperature of 20° C. The pressure lies between 1 and 100 kg./cm.$^2$, preferably 10 kg./cm.$^2$.

The reaction mixture must be free from any product which may destroy the catalyst.

Instead of using pure propylene, either gaseous or liquid, it is also possible to utilise substances containing propylene, particularly gaseous or liquid mixtures of propane-propylene diluted in one or more inert gases.

Polymerization generally occurs in the presence of suitable solvents. It is preferable to use aliphatic hydrocarbons such as isooctane, n-heptane, and pentane. Aromatic solvents can also be used. It is obvious that this list is not limitative. In the case of polymerization under conditions in which the propylene is liquid it is only necessary to use the minimum of solvent required for manipulation of the catalyst.

According to a feature of the present invention, the catalyst is introduced into the reactive medium before or during polymerization. It is also possible to introduce separately into the reactive mixture the titanium tetrachloride and the mixture of the two organometallic compounds in the order preferred. In the case where the process is carried out in the presence of a solvent, the catalyst is added before or after the propylene has been introduced into the solvent.

The products obtained according to the present invention by polymerization of propylene or non-caking solids with a density higher than 0.90, and the melting point of which, determined at the Kofler bench, is generally of the order of 150 to 170° C. and the molecular weight is generally above 100,000. The polymerization can be regulated (duration, temperature, pressure, solvent), or the choice of catalysts can be such that polymers are obtained with molecular weights of the order of 250,000 and over, or else with molecular weights lower than 100,000.

In this description and the examples the molecular weights are deduced from the intrinsic viscosities as defined below.

The viscosities were determined at 135° C., the solvent being tetraline.

The specific viscosity $n_{sp}$ is expressed by the relation $$n_{sp} = \frac{n_s}{n_o} - 1$$

where $n_s$ = viscosity of the solution of the polymer.
$n_o$ = viscosity of the solvent.

The intrinsic viscosity or limit viscosity is expressed by the limit at C=0 of the relation:

$$\frac{n_{sp}}{C}$$

where $C$=concentration of the polymer in grammes per 100 ml. of solvent at a temperature of 20° C.

For practical reasons no measurements were made with $C$ less than 0.02.

The molecular weights M were calculated by means of the formula $$M = \frac{\text{Limit viscosity}}{2.5} 10^5$$

(G. Ciampa, Chimica e Industria, 38 (1956), 298–303).

It is possible to determine the crystallinity of the propylenes obtained by X-ray diffraction measurement and by analysis of X-ray absorption spectra. The latter process permits the differentiation of crystalline products from amorphous products.

In the following examples "Cr" or "crystallinity Cr" is conventionally used to indicate the percentage of crystallinity in relation to a polymer of propylene of which the established crystallinity has been found to be the greatest up to the present time.

This crystallinity Cr is deduced from infra-red absorption spectra of pellicles obtained by melting polymers. The ratio of the respective absorptions of two bands is measured, one with a wave length of 11.89 microns, attributed essentially to the isotaxic forms, the other of 10.28 microns being attributed to the sum of isotaxic and non-isotaxic forms (J. Polymer Science, 16, (1956), 143–154).

The crystallinity Cr is calculated from the relation $$Cr = r_{\text{absorption}} \times \frac{100}{0.76}$$

where $$r_{\text{absorption}} = \frac{\log (I_0 : I_1)}{\log (I_0 : I_2)}$$

with $I_0$ is an energy of zero absorption,
$I_1$ is an energy of absorption up to 11.89 microns,
$I_2$ is an energy of absorption up to 10.28 microns,
$0.76 = r_{\text{absorption}}$ for the propylene with greatest known crystallinity.

The polymer prepared according to the present invention (possibly after the addition of anti-oxidants or other compounds) can be used for a wide variety of purposes such as plastic materials, monofilaments and textiles, glues, protective coatings, etc. Since the polypropylenes are thermoplastic substances they can be treated by means of the techniques employed for other high polymers such as polyethylenes, polyamides, polyesters, polyurethanes, although the working conditions must be adapted to the special features of the ultimate products. Thus it is possible to use, according to the purpose intended, compression or injection moulding, extrusion in sheets, tubes, or threads, casting in sheets, wire-drawing by melting or starting from solutions, etc.

Several polypropylene preparations are described in the following examples, but it is obvious that the invention is not limited to the examples given.

*Example 1*

A solution of 1.9 g. (=10 millimols) of titanium tetrachloride in 50 ml. of pentane is added to a suspension, in 150 ml. of pentane, of a mixture containing 0.575 g. of sodium in the form of amyl sodium (2.35 g. of amyl sodium=25 millimols) and 1 g. (=6 millimols) of diethyl cadmium. The amyl sodium is prepared in known manner starting from amyl chloride and sodium, the suspension of amyl sodium contains finely divided sodium chloride. The brownish-black catalyst which is formed is transferred into an iron, pressure-resisting tube fitted with a manometer and having a capacity of 280 ml. A cover provided with a pressure reducing valve is fitted on to this. The tube is then placed in a vertical position and connected at the base to a cylinder of propylene. A flow of propylene is then passed through in order to remove the air remaining insinde the tube, the pressure reducing valve is then closed and gaseous propylene is admitted until the pentane is saturated under a pressure of 10 kg./cm.² This pressure is maintained for 20 hours at 20° C. The excess gas is then removed through the upper part of the tube and the content of the latter is treated with ethanol to destroy the catalyst. The filtered polymer is substantially washed with ethanol acidified with hydrochloric acid, then washed with water to dissolve the salts which have formed. After drying, 16 g. of a white powder are obtained, consisting of a polypropylene of molecular weight 200,000, melting point 150° C., and a crystallinity Cr of 89%.

If the same experiment is made with a catalyst free from diethyl cadmium, without modifying the amounts of the other constituents and under the above-described conditions, 22 g. of a spongy polymer are obtained having a molecular weight of 230,000, a melting point with a very wide range, lying between 155 and 160° C., and a crystallinity Cr of 45%.

*Example 2*

The catalyst is prepared as follows:

0.17 g. (=1 millimol) of diethyl cadmium in 100 ml. of pentane is caused to react with 1.9 g. (=10 millimols) of titanium tetrachloride. Then a suspension of 2.35 g. amyl sodium (=25 millimols) in 100 ml. of pentane is added. Under the experimental conditions described in Example 1, there is obtained 18 g. of a polymer having a molecular weight of 355,000, a melting point of 154° C., and a crystallinity Cr of 74%.

*Example 3*

The catalyst is prepared as follows:

A suspension of 2.35 g. of amyl sodium (=25 millimols) in 100 ml. of pentane is mixed with 4 g. (=24 millimols) of diethyl cadmium in 10 ml. of benzene. To this mixture is added 1.9 g. (=10 millimols) of titanium tetrachloride dissolved in 100 ml. of pentane. Under the experimental conditions described in Example 1, there is obtained 5.5 g. of a polymer having a molecular weight of 175,000, a melting point of 180° C., and a crystallinity Cr of 102%.

*Example 4*

The catalyst is prepared as follows:

0.17 g. (=1 millimol) of diethyl cadmium dissolved in 50 ml. of pentane are caused to react with 1.9 g. (=10 millimols) of titanium tetrachloride dissolved in 50 ml. of pentane. This gives a suspension of a brown precipitate to which is added a suspension of 3.57 g. of amyl sodium (=38 millimols) in 100 ml. of pentane. Under the experimental conditions described in Example 1, there is obtained 10 g. of a white polymer having a molecular weight of 420,000, a melting point of 157° C., and a crystallinity Cr of 83.5%.

*Example 5*

Diamyl cadmium is first prepared in cyclohexane by the reaction of amyl lithium with a stoichiometric quantity of anhydrous cadmium chloride. A mixture of lithium chloride in suspension in the solvent and dissolved diamyl cadmium are obtained. Without isolating the latter its concentration is determined analytically and 2.5 ml. of it are taken off, containing 0.127 g. of diamyl cadmium (=0.5 millimol). To this is added a solution of 1.9 g. (=10 millimols) of titanium tetrachloride in 50 ml. of pentane, then a suspension of 2.35 g. of amyl sodium (=25 millimols) in 150 ml. of pentane.

Under the experimental conditions described in Example 1, there is obtained 27.5 g. of a white polymer having a molecular weight of 115,000, a melting point of 148° C., and a crystallinity Cr of 73%.

Example 6

A solution of 1.9 g. of titanium tetrachloride (10 millimols) in 50 ml. of pentane are added to a suspension of 2.35 g. of amyl sodium (=25 millimols) in 100 ml. of pentane. A dark brown suspension is obtained, to which is added 0.17 g. (=1 millimol) of diethyl cadmium dissolved in 50 ml. of pentane.

Under the experimental conditions described in Example 1, there is obtained 10 g. of a polymer having a molecular weight of more than 400,000 on average, a melting point of 150° C., and a crystallinity Cr of 82%.

Example 7

The same catalyst is used in three experiments of differing durations. This catalyst is prepared as follows: a solution of 3.8 g. (=20 millimols) of titanium tetrachloride in 50 ml. of anhydrous pentane is added to the mixture of 4.7 g. amyl sodium (=50 millimols) and 0.34 g. (=2 millimols) of diethyl cadmium in 150 ml. of pentane.

A pressure of 10 kg./cm.$^2$ of propylene is admitted to the suspension thus obtained, at a temperature of 20° C.

The first test is broken off after one hour. After the catalyst has been eliminated by washings, 4 g. of polymer are collected, having a molecular weight of 250,000 and a crystallinity Cr of 78%.

The second test is broken off after 4 hours. 10 g. of a polymer are collected, having a molecular weight of 280,000, a melting point of 156° C., and a crystallinity Cr of 75%.

The third test is broken off after 20 hours. 24.5 g. of a polymer are collected, having a molecular weight of 400,000, a melting point of 160° C., and a crystallinity Cr of 73%.

Example 8

A suspension of 1.42 g. of allyl sodium (22 millimols) in 100 ml. of pentane, prepared by the reaction of amyl sodium with propylene, is mixed with a solution of 0.17 g. of diethyl cadmium (1 millimol) in 50 ml. of pentane. To this is added a solution of 1.9 g. of titanium tetrachloride in 50 ml. of pentane. The suspension of the catalyst thus obtained is saturated with propylene under a pressure of 10 kg./cm.$^2$ for 20 hours at 20° C. After elimination of the catalyst by suitable washings, 10.5 g. of a polymer are collected, having a molecular weight of 390,000, a melting point of 152° C., and a crystallinity Cr of 78%.

We claim:

1. A process for the preparation of high crystalline polypropylene polymers which comprises contacting propylene, at a temperature between 0 and 40° C. and under a pressure between 1 and 100 kg./cm.$^2$, with a catalyst prepared by reacting one mole of titanium tetrachloride with 1 to 4 moles of an organosodium compound and 0.05 to 3 moles of an organocadmium compound, said organometallic compounds having the general formula $R_nMe$ wherein Me represents an atom of a metal selected from the group consisting of sodium and cadmium, R an aliphatic hydrocarbon radical containing from 2 to 5 carbon atoms, and $n$ is a whole number from 1 to 2, inclusive, according to the valency of the metal, and separating the high crystalline polypropylene polymers thus obtained.

2. A catalyst for the preparation of high crystalline polypropylene polymers prepared by reacting one mole of titanium tetrachloride with 1 to 4 moles of an organosodium compound and 0.05 to 3 moles of an organocadmium compound, said organometallic compounds having the general formula $R_nMe$ wherein Me represents an atom of a metal selected from the group consisting of sodium and cadmium, R is an aliphatic hydrocarbon radical containing from 2 to 5 carbon atoms and $n$ is a whole number from 1 to 2, inclusive, corresponding to the valency of the metal.

3. A catalyst for the preparation of highly crystalline polypropylene polymers prepared by reacting one mole of titanium tetrachloride with 2.5 moles of amyl sodium and 0.6 moles of diethyl cadmium.

4. A catalyst for the preparation of highly crystalline polypropylene polymers prepared by reacting one mole of titanium tetrachloride with 2.5 moles of amyl sodium and 0.1 mole of diethyl cadmium.

5. A catalyst for the preparation of highly crystalline polypropylene polymers prepared by reacting one mole of titanium tetrachloride with 3.8 moles of amyl sodium and 0.1 mole of diethyl cadmium.

6. A catalyst for the preparation of highly crystalline polypropylene polymers prepared by reacting one mole of titanium tetrachloride with 2.5 moles of amyl sodium and 0.05 mole of diamyl cadmium.

7. A catalyst for the preparation of highly crystalline polypropylene polymers prepared by reacting one mole of titanium tetrachloride with 2.2 moles of allyl sodium and 0.1 mole of diethyl cadmium.

References Cited in the file of this patent

UNITED STATES PATENTS

| 2,721,189 | Anderson et al. | Oct. 18, 1955 |
| 2,832,759 | Nowlin et al. | Apr. 29, 1958 |
| 2,834,768 | Friedlander | May 13, 1958 |

FOREIGN PATENTS

| 538,782 | Belgium | Dec. 6, 1955 |
| 526,101 | Italy | May 14, 1955 |

OTHER REFERENCES

Natta: Journal Polymer Science, vol. XVI, April, 1955, pages 143–154.

"Chemical and Engineering News," June 18, 1956, page 2980.